March 10, 1970 J. C. OSBORNE 3,499,671
FLARELESS TUBE COUPLING
Original Filed Nov. 8, 1965 2 Sheets-Sheet 1
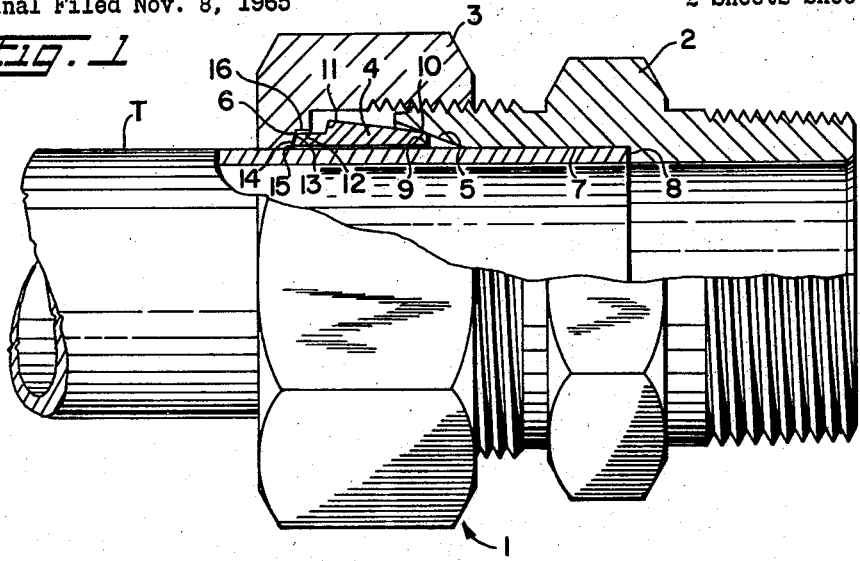
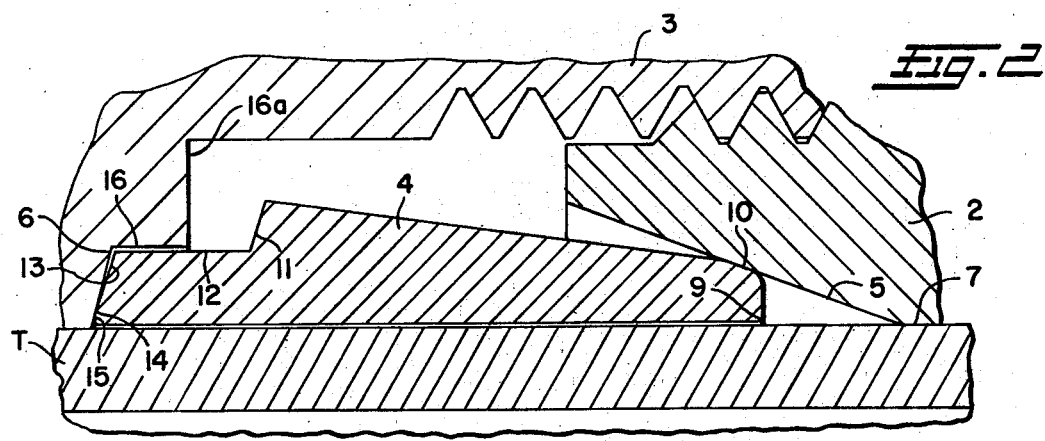
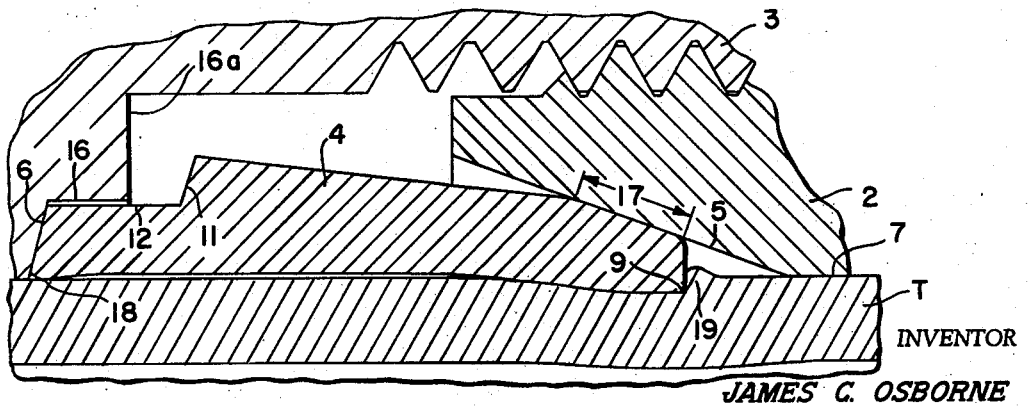
INVENTOR
JAMES C. OSBORNE
BY Oberlin, Maky & Donnelly
ATTORNEYS

United States Patent Office 3,499,671
Patented Mar. 10, 1970

3,499,671
FLARELESS TUBE COUPLING
James C. Osborne, Richmond Heights, Ohio, assignor to Parker-Hannifin Corporation, Cleveland, Ohio, a corporation of Ohio
Continuation of application Ser. No. 506,633, Nov. 8, 1965. This application Dec. 31, 1968, Ser. No. 798,850
Int. Cl. F16l 19/06, 19/08
U.S. Cl. 285—341                                        4 Claims

ABSTRACT OF THE DISCLOSURE

A flareless tube coupling including a ferrule having an externally tapered portion at one end of taper less than that of the flare mouth of the body against which the externally tapered portion of the ferrule is urged by a nut having threaded engagement with the body. The maximum thickness of the ferrule is approximately twice the minimum thickness at such one end, and the other end is beveled for a major portion of its radial width leaving a narrow inner annular end face which forms a rounded internal rib having vibration resisting contact around a tube when such other end is deformed into full mating contact with a shoulder on the nut.

---

Figure 4:
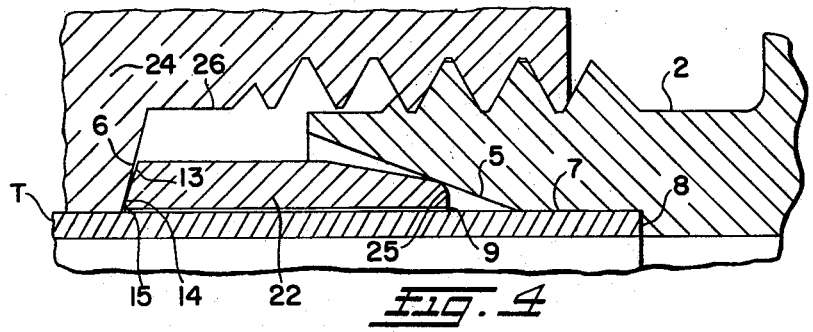

The present invention is a continuation of applicant's copending application Ser. No. 506,633, filed Nov. 8, 1965 and now abandoned, and relates generally as indicated to a flareless tube coupling and has for its principal object the provision of such coupling which is foolproof in operation and results in a fluid-tight joint, the tube being firmly gripped at a zone adjacent its end to resist pull out or blow-off and being supported at a zone axially spaced from such gripping zone to isolate vibration from the last-mentioned zone.

These and other objects and advantages of the present invention which will become apparent as the following description proceeds are accomplished by providing the tube coupling with a body having a flare mouth of approximately 15 to 25° taper and a ferrule having a tapered end less than that of the flare mouth which is radially contracted into gripping and sealing engagement around a tube therewithin when urged axially against the flare mouth of the body by engagement of the other end of the ferrule by a nut having threaded engagement with the body. The maximum thickness of the ferrule is about twice the minimum thickness at the first-mentioned end, and the other end is beveled for a major portion of its radial width leaving a narrow inner annular end face which is deformed under high torque loads into vibration resisting contact with the tube.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a side elevation view, partly in radial cross-section, showing one form of flareless tube coupling embodying the present invention in its fingertight condition;

FIGS. 2 and 3 are much enlarged cross-section views showing the coupling of FIG. 1 in its fingertight and normally wrench-tightened condition, respectively; and FIGS. 4 and 5 and FIGS. 6 and 7 are cross-section views similar to FIGS. 2 and 3, except illustrating modified forms of flareless tube couplings according to the present invention.

Referring now more particularly to the drawing, and first to FIGS. 1, 2, and 3 thereof, the flareless tube coupling 1 comprises a body member 2, a nut member 3 having threaded engagement with said body member 2, and a ferrule 4 surrounding the tube T and disposed between the flare mouth 5 of the body member 2 and the beveled shoulder 6 of the nut member 3.

The body member 2 has a tube end receiving bore 7 which terminates in a shoulder 8 against which the end of the tube is adapted to be abutted as shown. The flare mouth 5 in said body member 2 is herein shown as having a taper of 20° (40° apex angle) and engaged therewith is the front end portion of the ferrule 4 which preferably has a sharp inner corner 9 and an outer end portion 10 which has the same taper as the flare mouth 5 so as to have an initial surface contact with the flare mouth 5 thus to eliminate gouging of the ferrule 3 into the flare mouth 5 as the nut member 3 is tightened to axially advance the ferrule 4 against said flare mouth. From such surface 10 the ferrule 4 is tapered at an angle of about 6½° to a maximum diameter which is about ¾ of the length of the ferrule 4 rearward from the front end thereof. At such maximum diameter portion there is a beveled shoulder 11 from which extends the cylindrical portion 12 of the ferrule 4. The thickness of the rear cylindrical end portion 12 is preferably about 50% greater than the minimum thickness at the front end of the ferrule 4. The rear end of the ferrule 4 is beveled at 13 at an angle of about 18° starting at the point 14 outward of the ferrule bore so as to leave a plane annular end face 15 of about .005 to .010" radial width, the inner corner being broken or beveled as best shown in FIG. 2 a very slight amount, for example, .005" maximum.

The beveled shoulder 6 of the nut member 3 has a taper of about 15° so as to have an initial line contact at 14 with the rear end of the ferrule 4. The nut member 3 is counterbored at 16 to provide a guide for the rear cylindrical pilot portion 12 of the ferrule 4, such counterbore 16 being of depth less than the length of the portion 12 so that the shoulder 16a in the nut member will not contact the beveled shoulder 11 of the ferrule 4.

In FIGS. 1 and 2 the flareless tube coupling assembly 1 is shown in its fingertight condition with the surface 10 of the ferrule 4 in relatively wide surface contact with the flare mouth 5 of the body member 2 and with the intersection 14 of the plane rear end face 15 and beveled rear end face 13 in line contact with the beveled shoulder 6 in the nut member 3. As the nut member 3 is tightened as with a wrench (not shown), the ferrule 4 will be forced axially toward the right as in FIG. 3 to contract the front end thereof into firm biting and fluid-tight engagement with the tube T, and as this occurs the ferrule 4 slightly bows or arches as shown, so that a substantial length 17 thereof is in contact with the flare mouth 5. At that stage of assembly, the resistance to further contraction of the front end of ferrule 4 is so great that the rear end of the ferrule 4 is deformed as in FIG. 3 to match the taper of shoulder 6. This causes the formation of a rounded bead or rib 18 which has firm vibration-resistance contact around the tube T at a zone spaced a substantial distance from the gripping zone at and adjacent edge 9. If the ferrule 4 is of material harder than the tube T, the aforesaid contraction of the front end of the ferrule 4 will cause the edge 9 thereof to bite into the surface of the tube T, and as the ferrule moves axially along the tube T, it will plow up a holding shoulder 19 on the tube T thus to firmly grip the tube T and to form a fluid-tight seal at such shoulder 19 and for a substantial distance axially rearward thereof. The exterior of the ferrule 4 will also have fluid-tight engagement with flare mouth 5. Even though the ferrule 4 and tube T may be made of materials having equal hardness, the contraction of the front end of the ferrule 4 around the tube T will effect firm frictional and fluid-tight gripping engagement, and furthermore, there may be seizing or galling action which, in effect, welds the ferrule 4 to the tube T. Since there is no cutting or biting into the tube T at the rear end of the ferrule 4, vibration strains are snubbed thereat so as to protect the firm gripping and sealing area at the front end of the ferrule 4.

In the example herein shown, the ferrule 4 for 1" diameter tube T has a length of about ½" and the length of the cylindrical rear end portion 12 is about ⅛". The surface 10 having the 20° taper matching that of the flare mouth 5 has a length of about ¹⁄₃₂" with the corner rounded from .005 to about .007 inch. The dimensions previously mentioned are for this same ferrule 4 for 1" diameter tube T.

Referring now to FIGS. 4 and 5, and 6 and 7, it has been found that for flareless tube couplings for ⅛" diameter tubing (FIGS. 4 and 5) and for ¼" diameter tubing (FIGS. 6 and 7), the cylindrical pilot portion 12 and the counterbore 16 may be omitted when the ferrules 22 and 23 are of length approximating or exceeding the diameter of the tube T. Otherwise, the beveled shoulders 6 of nut members 24 are the same as in nut member 3 and the rear ends of ferrules 22 and 23 are shaped the same as the rear end of ferrule 4, that is, provided with an 18° beveled end 13 which intersects the .005 to .010" flat 15 at point 14.

Each ferrule 22 and 23 has a sharp leading edge 9 for biting into the tube T and the external corner 25 is rounded with a radius of .010 to .015" from which the respective ferrule tapers at an angle of from about 7½ to 10° to a maximum diameter at which the ferrule thickness is at least twice the thickness at the front biting end. The same applies to ferrule 4 except that because of the steeper taper of 20° of the surface 10, the 6½° taper will make the maximum thickness at least twice the average thickness at the middle of surface 10.

It has been found that best results are obtained when the flare mouth 5 of the coupling body member 2 has a relatively steep taper of about 20°, or from about 15 to 25° as a suitable range, and in the smaller size couplings for gripping tubes ranging from ⅛" to ⅜" diameter the tapered portion of the ferrule 22 or 23 should have a minimum thickness of about .025" plus or minus a few thousandths of an inch, a maximum thickness of about .050" plus or minus a few thousandths of an inch, and a length of from about ⁵⁄₃₂" to about ³⁄₁₆" of said tapered portion. The larger sizes of tube couplings for ½" to 1" diameter tube T should have a tapered portion 10 of 20° taper the same as the taper of the flare mouth 5 and a length of about .030" plus or minus a few thousandths of an inch. The minimum thickness of such ferrules 4 should be about .040" with an average or median thickness at the section 10 of about .045". The maximum thickness of such larger size ferrules 4 should be about .090", i.e. at least twice the minimum thickness, and the length of the tapered portion to the right of the shoulder 11 should be about ⅜".

Figure 5:
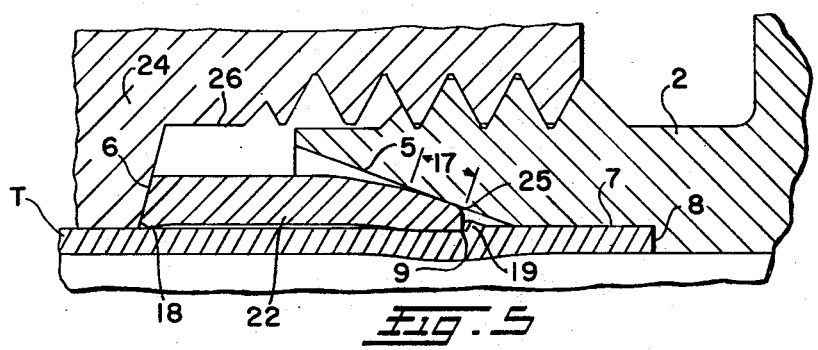
Figure 6:
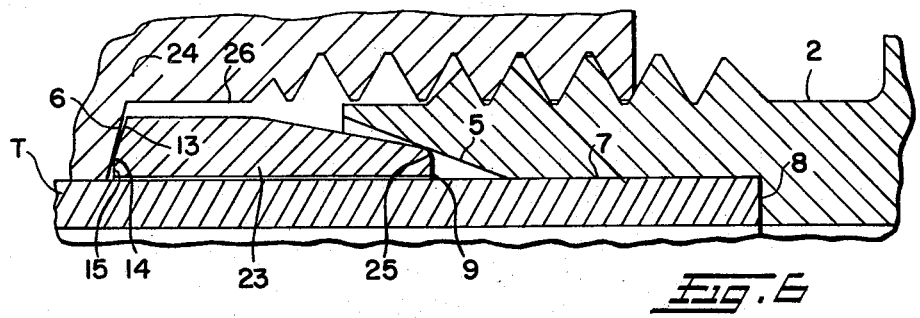
Figure 7:
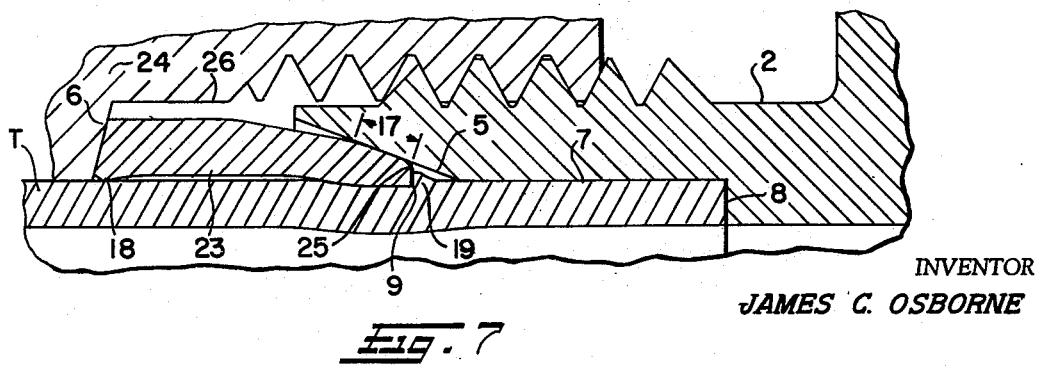

When the tapered portions of the ferrules 4, 22, and 23 are proportioned as just described, the thickest portion effectively resists arching or bowing while at the same time a relatively low assembly torque is required, but such torque abruptly rises when the tubes T are firmly gripped in fluid-tight manner. Moreover, in all forms of ferrules 4, 22, and 23 herein disclosed, the rear end is fashioned so that when the proper assembly torque is applied the rear ends thereof will be properly deformed as shown in FIGS. 3, 5 and 7 to provide a well-rounded bead or rib which engages the tube T in firm vibration-resisting contact to prevent vibration strains from reaching the gripped and sealed end of the tube. The ferrule 4, of course, has the further advantage of being provided with the cylindrical extension 12 which is guided in the counterbore 16 to assist in maintaining the rear end of the ferrule coaxial with the front end which confronts the flare mouth 5. While not shown herein, the nut members 24 in FIGS. 4, 5 and FIGS. 6, 7 may have smaller bores 26 to embrace the maximum diameters of the ferrules 22 and 23 in guiding relation if desired or found necessary. In FIGS. 4 and 5 such guiding of the ferrule 22 can be dispensed with because the ferrule for ⅛" diameter tubing is nearly twice as long as the diameter of the tubing. Accordingly, the minute clearance between the bore of ferrule 22 and the outside of the tube T will prevent excessive misalignment of the rear end of the ferrule with respect to the front end thereof. In the case of the ferrule 23 shown in FIGS. 6 and 7 for ¼" tubing the ferrule length is approximately equal to the diameter of the tube. The ferrule 4 for tubing from ½" to 1" diameter will have a total length of about ½" and it is preferred to employ the cylindrical extension 12 of less than maximum thickness guided in a counterbore 16 in the nut member 3.

Other modes of applying the principles of the invention may be employed.

I, therefore, particularly point out and distinctly claim as my invention:

1. In a flareless tube coupling of the type wherein a ferrule is radially contracted at one end into gripping and sealing engagement around a tube therewithin when urged axially against the flare mouth of a body by engagement of the other end of said ferrule by a nut having threaded engagement with said body; the improvement which comprises the provision of a flare mouth in said body of 15° to 25° taper, and of an externally tapered portion on said ferrule of taper substantially one-half that of said flare mouth and of length from said one end such that maximum thickness of said ferrule is substantially twice the minimum thickness at said one end whereby said ferrule is thus contracted by relatively low torque on said nut which markedly increases when said one end of said ferrule is in wedging and sealing engagement with said flare mouth and said tube to indicate proper tightening and to preclude inadvertent overtightening thereof, the small end of said tapered portion for a length of about ¹⁄₃₂" being of taper substantially the same as that of said flare mouth to provide an initial surface contact between said ferrule and flare mouth to preclude gouging of the latter during such contraction of said ferrule, said ferrule having a cylindrical portion adjacent the other end, and said nut having a counterbore around said cylindrical portion to coaxially position that end of said ferrule with respect to said one end, the thickness of said cylindrical portion being less than such maximum thickness, and said counterbore being of axial length less than the axial length of said cylindrical portion thus to limit engagement of said nut to said other end of said ferrule, said other end of said ferrule being beveled for a major portion of its radial width to leave a narrow inner annular end face, said nut having a shoulder initially engaging only the line of intersection of the beveled end face and annular end face of said ferrule until the torque thereon markedly increases, and with further tightening of said nut the beveled end face of said ferrule is deformed into full mating contact with said nut shoulder thereby forming a rounded internal rib on said other end of said ferrule having vibration resisting contact around said tube.

2. In a flareless tube coupling of the type wherein a ferrule is radially contracted at one end into gripping and sealing engagement around a tube therewithin when urged axially against the flare mouth of a body by engagement of the other end of said ferrule by a nut having threaded engagement with said body; the improvement which comprises the provision of a flare mouth in said body of 15° to 25° taper, and of an externally tapered portion on said ferrule of taper less than that of said flare mouth and of length from said one end such that the maximum thickness of said ferrule is substantially twice the minimum thickness at said one end whereby said ferrule is thus contracted by relatively low torque on said nut which markedly increases when said one end of said ferrule is in wedging and sealing engagement with said flare mouth and said tube to indicate proper tightening and to preclude inadvertent overtightening thereof, the small end of said tapered portion for a length of about 1/32" being of taper substantially the same as that of said flare mouth to provide an initial surface contact between said ferrule and flare mouth to preclude gouging of the latter during such contraction of said ferrule, said ferrule having a cylindrical portion adjacent the other end, said nut having a counterbore around said cylindrical portion to coaxially position that end of said ferrule with respect to said one end, the thickness of said cylindrical portion being less than such maximum thickness, and said counterbore being of axial length less than the axial length of said cylindrical portion thus to limit engagement of said nut to said other end of said ferrule, said other end of said ferrule being beveled for a major portion of its radial width to leave a narrow inner annular end face, said nut having a shoulder initially engaging only the line of intersection of the beveled end face and annular end face of said ferrule until the torque thereon markedly increases, and with further tightening of said nut the beveled end face of said ferrule is deformed into full mating contact with said nut shoulder thereby forming a rounded internal rib on said other end of said ferrule having vibration resisting contact around said tube.

3. In a flareless tube coupling of the type wherein a ferrule is radially contracted at one end into gripping and sealing engagement around a tube therewithin when urged axially against the flare mouth of a body by engagement of the other end of said ferrule by a nut having threaded engagement with said body; the improvement which comprises the provision of a flare mouth in said body of 15° to 25° taper, and of an externally tapered portion on said ferrule of taper less than that of said flare mouth and of length from said one end that the maximum thickness of said ferrule is substantially twice the minimum thickness at said one end whereby said ferrule is thus contracted by relatively low torque on said nut which markedly increases when said one end of said ferrule is in wedging and sealing engagement with said flare mouth and said tube to indicate proper tightening and to preclude inadvertent overtightening thereof, said other end of said ferrule being beveled for a major portion of its radial width to leave a narrow inner planar annular end face, and said nut having a shoulder initially engaging only the line of intersection of the beveled end face and annular end face of said ferrule until the torque thereon markedly increases, and with further tightening of said nut the beveled end face of said ferrule is deformed into full mating contact with said nut shoulder thereby forming a rounded internal rib on said other end of said ferrule having vibration resisting contact around said tube, said ferrule having a cylindrical portion adjacent said other end, and said nut having a counterbore around said cylindrical portion to coaxially position that end of said ferrule with respect to said one end, the thickness of said cylindrical portion being less than said maximum thickness, said maximum thickness extending radially outwardly beyond said counterbore, and said counterbore being of axial length less than the axial length of said cylindrical portion thus to limit engagement of said nut to said other end of said ferrule.

4. The coupling of claim 3 wherein said planar annular end face is approximately .005" to .010" radial width, and the radial inner corner of said planar annular end face is beveled .005" maximum.

References Cited

UNITED STATES PATENTS

| | | | |
|---|---|---|---|
| 2,201,404 | 5/1940 | Kreidel | 285—382.7 X |
| 2,211,856 | 8/1940 | Kreidel | 285—341 |
| 2,252,920 | 8/1941 | Edelmann | 285—341 |
| 2,738,994 | 3/1956 | Kreidel et al. | 285—382.7 X |
| 3,075,793 | 1/1963 | Lennon et al. | 285—382.7 X |
| 3,092,405 | 6/1963 | Wurzburger | 285—382.7 X |
| 3,325,192 | 6/1967 | Sullivan | 285—382.7 X |

FOREIGN PATENTS

| | | |
|---|---|---|
| 1,256,108 | 2/1961 | France. |
| 1,316,605 | 12/1962 | France. |
| 579,145 | 7/1946 | Great Britain. |

DAVID J. WILLIAMOWSKY, Primary Examiner

D. W. AROLA, Assistant Examiner

U.S. Cl. X.R.

285—354, 382.7